April 20, 1937. D. L. HIGGINS 2,077,625
HEAT EXCHANGE APPARATUS
Filed May 23, 1935
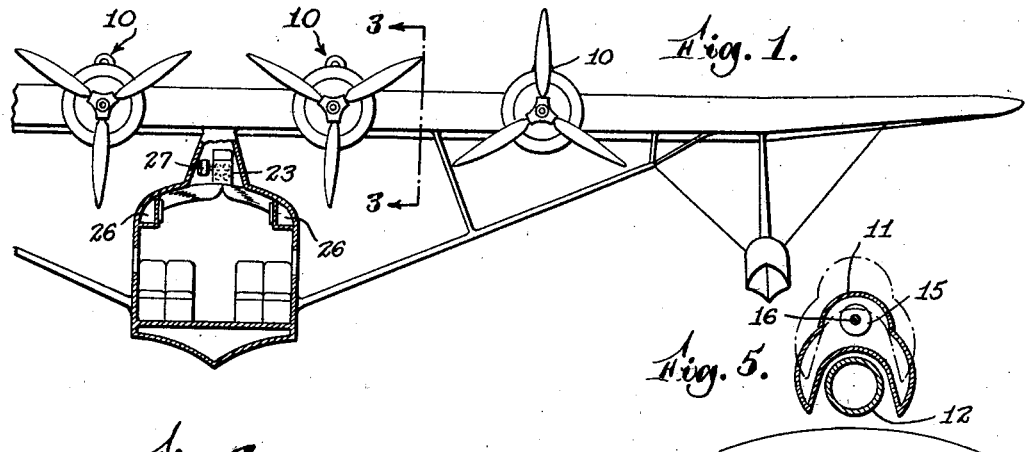
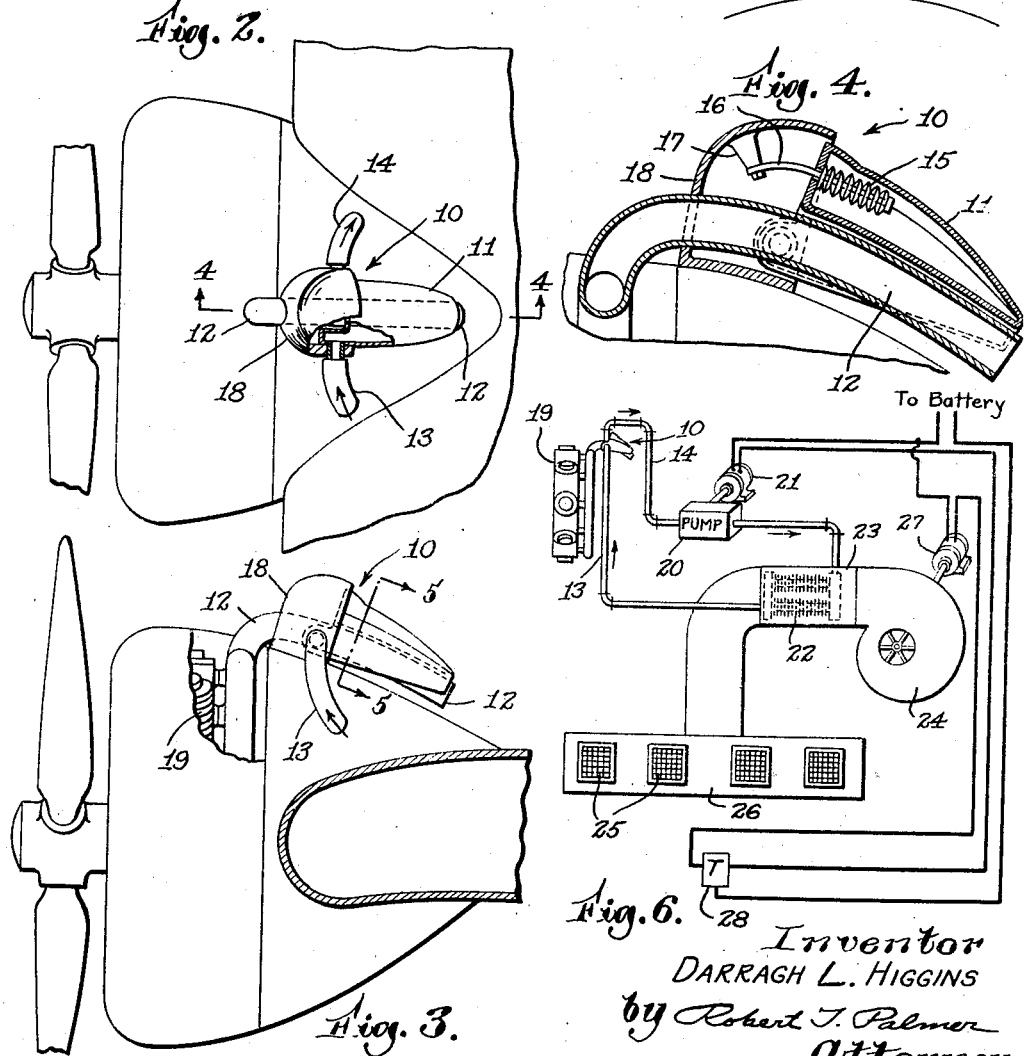
Inventor
DARRAGH L. HIGGINS
by Robert T. Palmer
Attorney Patented Apr. 20, 1937

2,077,625

UNITED STATES PATENT OFFICE 2,077,625

HEAT EXCHANGE APPARATUS

Darragh Loring Higgins, Dedham, Mass., assignor to B. F. Sturtevant Company, Inc., Hyde Park, Boston, Mass.

Application May 23, 1935, Serial No. 22,947

5 Claims. (Cl. 257—2)

This invention relates to heat exchange apparatus and relates more particularly to apparatus for the heating and distribution of air in airplanes.

This application is a continuation in part of my copending application, Serial No. 12,679, filed March 23, 1935, and which issued on January 7, 1936 as Patent No. 2,027,315. In said co-pending application, there is disclosed an efficient system for ventilating and heating the passenger space of an airplane, the air being forced under pressure into the passenger space, and the energy for heating the air being obtained from the exhaust gases of the airplane engines.

This invention provides satisfactory automatic controls for the proper functioning of the heating system disclosed in said application. It has been determined that automatic controls are essential because of the operating conditions to which an airplane is subjected. For example, when the airplane is flying a considerable distance above the ground, the surrounding air is so cold that considerable heat is required even on a hot summer day. The moment the airplane lands, little or no heat is required and the operators have been unable to control the temperature merely by adjustment of the ventilating fans, and of the pump which circulates the heating medium.

According to a feature of this invention, a liquid heating member, which the airplane engineers have termed a "stove", is mounted in heat exchange relationship with the exhaust outlet of an engine in such a way that its position may be varied to increase or decrease respectively, the heat transferred from the exhaust gases to the heat transfer liquid which is afterwards circulated through heat exchange coils for air heating purposes. While this adjustable member could be adjusted manually, in one and the preferred embodiment, it has associated with it, a thermostat which acts to vary the position of the member with respect to the exhaust outlet. The thermostat acting to adjust the stove member is so adjusted as to maintain a substantially constant temperature of heat transfer liquid.

According to another feature of the invention, a thermostat exposed to conditions within the passenger space acts to first shut off the air moving fan, then the liquid circulating pump as the temperature increases above that desired. With this control, together with the automatic control of fluid temperature, it has been found that the proper temperature may be maintained within the passenger space of a cabin airplane, regardless of change in altitude and other operating conditions.

An object of the invention is to automatically control the temperature of a fluid heated by the exhaust gases of an internal combustion engine.

Another object of the invention is to heat a liquid containing member with heat from the exhaust outlet of an internal combustion engine, and to vary the position of the member with respect to the outlet to control the temperature of the liquid.

Another object of the invention is to provide an automatic control for maintaining the desired temperature in the passenger space of a cabin airplane.

Other objects of the invention will be apparent from the following description taken together with the drawing.

The invention will now be described with respect to the drawing of which:

Fig. 1 is a partial front view with cabin in section of an airplane equipped according to this invention;

Fig. 2 is a plan view looking downwardly upon one of the airplane engines equipped with heat exchange apparatus according to this invention;

Fig. 3 is a sectional view along the lines 3—3 of Fig. 1 and illustrates the side view of a heat exchange apparatus according to this invention;

Fig. 4 is a sectional view along the lines 4—4 of Fig. 3;

Fig. 5 is a sectional view along the lines 5—5 of Fig. 3, and

Fig. 6 is a diagrammatic view illustrating the heating and ventilating systems as a whole.

Associated with the exhaust outlet of one or more of the plurality of engines of Fig. 1 is the heat transfer or stove member indicated generally by 10. This member includes the liquid containing member 11 which may be either mounted in contact with the upper surface of the exhaust gas outlet 12 or spaced slightly therefrom in its position of maximum heat transfer as illustrated by the full lines of Fig. 4. The member 11 preferably contains a high boiling liquid such, for example, as Prestone which, after being heated, is circulated to the air heating coils as will be afterwards explained.

The liquid to be heated enters the member 11 through the pipe 13 and leaves through the pipe 14 shown by Figs. 2 and 6. The member 11 is pivotally mounted around these pipes 13 and 14. The thermostat 15, shown by Fig. 4 is exposed to the liquid within the member 11 and its outer portion is connected to one end of the lever 16 which has its other end fixedly attached to the support 17. As the temperature of the liquid in the member 11 increases above a predetermined point, the thermostat 15 expands and in its movement lifts the lower end of the member 11 to the position shown by the dash-dot lines of Fig. 5. Likewise, as the temperature of the liquid in the member 11 decreases below the predetermined point, the thermostat 15 contracts and lowers the member 11 to the position shown by the full lines of Figs. 4 and 5. The shield 18 acts as a housing for streamlining the air flow past the heat exchange apparatus 10.

Referring now to Fig. 6, the exhaust gases from the engine 19 heat the liquid in the heat exchange apparatus 10 to the desired temperature. This liquid is circulated by the pump 20, driven by the electric motor 21 through the heat exchange coils 22 in the air heating chamber 23. The blower 24 forces air past the coils 22 and into the passenger space from the outlets 25 in the overhead ducts 26. The blower is driven by the electric motor 27.

The motor 27 and the pump motor 21 are preferably energized from the usual electric storage batteries carried by the airplane and the thermostat 28 acts to control the operation of these motors as follows:

When the temperature within the cabin rises, as when the airplane is descending, the blower motor 27 is cut out of circuit or alternatively it may have its speed decreased. Then when the temperature increases further, the pump 21 is stopped or has its speed decreased, thus lowering the heat received by the coils 22 from the circulating fluid. The fluid is prevented from reaching a temperature which would result in heat being transferred to the air from the coils 22 despite the stoppage of the pump 20 by reason of the adjustment of the liquid heating member 11, by the thermostat 15, as has previously been described.

While the thermostat 15 has been illustrated as a direct acting one, it should be understood that it may be a monitoring thermostat controlling an air or electrically actuated mechanism for adjusting the liquid heating member 11.

Obviously, the position of the liquid heating member 11 could be controlled by a thermostat exposed to the temperature within the passenger space. Of course, many alternative arrangements of thermostats other than those disclosed could be used to accomplish the results sought. The embodiments illustrated are those which have proved successful and it should be understood that the invention is not limited to the exact arrangements disclosed, as many departures may be made by those skilled in the art, after having had access to this disclosure, without departing from the spirit of the invention.

What is claimed is:

1. Heat exchange apparatus for heating a liquid by the exhaust gases from an internal combustion engine, comprising in combination, a tube conveying exhaust gases from said engine, a member adapted to contain a liquid to be heated, mounting means for pivotally supporting said member alongside said tube, a thermostat, and means controlled by said thermostat for rotating said member around said mounting means towards and from said tube.

2. Heat exchange apparatus for heating a liquid by the exhaust gases from an internal combustion engine, comprising in combination, a tube conveying exhaust gases from said engine, a member adapted to contain a liquid to be heated, mounting means for pivotly supporting said member adjacent one end thereof alongside said tube, a thermostat, and means controlled by said thermostat for rotating said member around said mounting means towards and from said tube.

3. Heat exchange apparatus for heating a liquid by the exhaust gases from an airplane engine comprising in combination, a tube conveying exhaust gases from said engine, a member adapted to contain a liquid to be heated, a streamlined housing in advance with respect to air flow of said member, mounting means for pivotly supporting said member adjacent its front end with respect to air flow, a thermostat, and means controlled by said thermostat for rotating said member around said mounting means towards and from said tube and for moving said front end of said member into and out of said housing.

4. Heat exchange apparatus for heating a liquid by the exhaust gases from an internal combustion engine, comprising in combination, a tube conveying exhaust gases from said engine, a member adapted to contain a liquid to be heated, inlet and outlet pipes for conveying liquid to and from said member, mounting means for pivotly supporting said member at said pipes alongside said tube, a thermostat, and means controlled by said thermostat for rotating said member around said mounting means towards and from said tube.

5. Heat exchange apparatus for heating a liquid by the exhaust gases from an internal combustion engine, comprising in combination, a tube conveying exhaust gases from said engine, a member adapted to contain a liquid to be heated, inlet and outlet pipes connecting with the end of said member nearest said engine, for conveying liquid to and from said member, mounting means for pivotly supporting said member at said pipes alongside said tube, a thermostat, and means controlled by said thermostat for rotating said member around said mounting means towards and from said tube.

DARRAGH LORING HIGGINS.